United States Patent
Suita

(10) Patent No.: US 11,440,356 B2
(45) Date of Patent: Sep. 13, 2022

(54) TIRE AND TIRE MANUFACTURING METHOD

(71) Applicant: Toyo Tire Corporation, Itami (JP)

(72) Inventor: Harunobu Suita, Itami (JP)

(73) Assignee: Toyo Tire Corporation, Itami (JP)

( * ) Notice: Subject to any disclaimer, the term of this patent is extended or adjusted under 35 U.S.C. 154(b) by 118 days.

(21) Appl. No.: 16/724,839

(22) Filed: Dec. 23, 2019

(65) Prior Publication Data

US 2020/0207161 A1    Jul. 2, 2020

(30) Foreign Application Priority Data

Dec. 26, 2018   (JP) .............................. JP2018-243522

(51) Int. Cl.
    *B60C 19/00*      (2006.01)
    *B60C 15/06*      (2006.01)

(52) U.S. Cl.
    CPC .............. *B60C 19/00* (2013.01); *B60C 15/06* (2013.01); *B60C 2015/0621* (2013.01); *B60C 2019/004* (2013.01)

(58) Field of Classification Search
    CPC ... B60C 19/00; B60C 2019/004; B60C 15/06; B60C 15/0603; B60C 15/0607; B60C 15/0635; B60C 2015/0614; B60C 2015/0621; B60C 2015/0625; B60C 11/24; B29D 30/0061; B29D 2030/0077
    USPC ......................................................... 152/539
    See application file for complete search history.

(56) References Cited

U.S. PATENT DOCUMENTS

| | | | | |
|---|---|---|---|---|
| 5,196,077 A | * | 3/1993 | Kaga | ....................... B60C 15/06 152/539 |
| 8,977,422 B1 | | 3/2015 | Westfall | |
| 2006/0164250 A1 | | 7/2006 | Kawai | |
| 2008/0289736 A1 | | 11/2008 | Adamson et al. | |
| 2011/0175778 A1 | | 7/2011 | Myatt | |
| 2012/0291936 A1 | * | 11/2012 | Lionetti | .............. B60C 23/0493 152/539 |
| 2015/0367685 A1 | * | 12/2015 | Takahashi | ................. B60C 9/18 152/525 |
| 2016/0107490 A1 | | 4/2016 | Randall et al. | |
| 2019/0322142 A1 | | 10/2019 | Lallement et al. | |

(Continued)

FOREIGN PATENT DOCUMENTS

| | | |
|---|---|---|
| CN | 1350919 A | 5/2002 |
| CN | 101279574 A | 10/2008 |
| CN | 103863020 A | 6/2014 |

(Continued)

OTHER PUBLICATIONS

Wakahiro Kawai, JP-2005096423-A, updated machine translation. (Year: 2005).*

(Continued)

*Primary Examiner* — Robert C Dye
*Assistant Examiner* — Sedef E Paquette
(74) *Attorney, Agent, or Firm* — Maier & Maier, PLLC

(57) ABSTRACT

A tire includes: a bead core; a bead filler which extends to an outer side in the tire-radial direction of the bead core; a carcass ply which extends from the bead core to another bead core, and folded back around the bead core; and a rubber sheet which covers a folding end of the carcass ply folded back, in which an electronic component is provided between the bead filler and the rubber sheet.

15 Claims, 8 Drawing Sheets

(56) References Cited

U.S. PATENT DOCUMENTS

2020/0079159 A1     3/2020  Destraves et al.
2021/0001671 A1*    1/2021  Cukierman ............... B60C 9/02

FOREIGN PATENT DOCUMENTS

| | | |
|---|---|---|
| CN | 105813863 A | 7/2016 |
| FR | 3 059 605 A1 | 6/2018 |
| JP | 2005-096423 A | 4/2005 |
| JP | 2007-230261 A | 9/2007 |
| JP | 2008-536357 A | 9/2008 |
| JP | 2008-265750 A | 11/2008 |
| JP | 2017218065 A | 12/2017 |
| JP | 2021046057 A * | 3/2021 |
| KR | 20100120505 A | 11/2010 |
| WO | 2006/098710 A1 | 9/2006 |
| WO | 2018/104623 A1 | 6/2018 |
| WO | 2018104620 A1 | 6/2018 |

OTHER PUBLICATIONS

Kaneya S, JP-2021046057-A, machine translation. (Year: 2021).*
Extended European Search Report dated Apr. 17, 2020, including the European Search Report and the European Search Opinion, in connection with corresponding EP Application No. 19217366.4 (7 pgs.).
Japanese Office Action dated Dec. 3, 2019 in corresponding Japanese Application No. 2018-243522; 8 pages; Partial machine translation attached.

* cited by examiner

TIRE AND TIRE MANUFACTURING METHOD

CROSS-REFERENCE TO RELATED APPLICATIONS

This application is based on and claims the benefit of priority from Japanese Patent Application No. 2018-243522, filed on 26 Dec. 2018, the content of which is incorporated herein by reference.

FIELD

The present invention relates to a tire in which an electronic component is embedded.

BACKGROUND

Conventionally, tires in which an electric component such as RFID is embedded within the rubber structure have been known. With such tires, by an RFID tag embedded in the tire and a reader as an external device carrying out communication, it is possible to perform production control of tires, usage history management, etc. For example, Japanese Unexamined Patent Application, Publication No. 2008-265750 shows a tire in which an electronic component is arranged at the boundary surface of two difference substances. The boundary surface of two substances at which this electronic component is arranged is a surface extending from a free edge of a carcass ply.

SUMMARY

With the technology shown in Patent Document 1, the boundary surface between two substances at which the electronic component is arranged becomes a surface extending from a free edge of the carcass ply; however, at this portion, stress and distortion tends to occur upon the tire deforming. Therefore, the electronic portion arranged at this portion is affected by the stress and distortion upon the tire deforming, and there is a possibility of no longer maintaining the function as an electronic component.

The present invention has been made taking account of the above-mentioned problem, and an object thereof is to provide a tire which can maintain the function of an embedded electronic component, by arranging the electronic component at a position which is hardly affected by the stress and distortion within the tire structure.

A tire (for example, the tire 1) according to a first aspect of the present invention includes: a bead core (for example, the bead core 21); a bead filler (for example, the bead filler 22) which extends to an outer side in a tire-radial of the bead core; a carcass ply (for example, the carcass ply 23) which extends from the bead core to another bead core, and is folded back around the bead core; and a rubber sheet (for example, the rubber sheet 37) which covers a folding end of the carcass ply which has been folded back, in which an electronic component (for example, the RFID tag 40) is provided between the bead filler and the rubber sheet.

According to a second aspect of the present invention, in the tire as described in the first aspect, the rubber sheet may be formed in an annular shape, and the rubber sheet of annular shape may cover the folding end (for example, the folding end 25A) of the carcass ply over an entire circumference thereof.

According to a third aspect of the present invention, in the tire as described in the second aspect, the bead filler may be formed in an annular shape, the rubber sheet may be formed in an annular shape by one end side and another end side of a long sheet being joined, and the electronic component may be provided between the bead filler of annular shape and the rubber sheet of annular shape within a range of +90 to +270 degrees, when defining a position at which being joined as 0 degrees, with a center of the bead filler as a reference.

According to a fourth aspect of the present invention, in the tire as described in any one of the first to third aspects, the electronic component in an uncoated state may be disposed between the bead filler and the rubber sheet.

According to a fifth aspect of the present invention, in the tire as described in any one of the first to third aspects, the electronic component may be covered by a coating rubber sheet (for example, the coating rubber sheet 431, 432), and the electronic component covered by the coating rubber sheet may be disposed between the bead filler and the rubber sheet.

According to a sixth aspect of the present invention, the tire as described in any one of the first to fifth aspects may further include a pad member which is disposed at an outer side in the tire-width direction of the folding end of the carcass ply, in which the rubber sheet and the electronic component may be disposed between the bead filler and the pad member.

According to a seventh aspect of the present invention, in the tire as described in the sixth aspect, a modulus of a portion (for example, the first pad 35) of the pad member at least covering the folding end of the carcass ply and a modulus of the rubber sheet may both be higher than a modulus of a rubber member (for example, the second bead filler 222, second pad 36) at a surrounding thereof.

According to an eighth aspect of the present invention, in the tire as described in the fifth aspect, a modulus of the coating rubber sheet may be lower than a modulus of the rubber sheet.

According to a ninth aspect of the present invention, in the tire as described in any one of the first to eighth aspects, the rubber sheet may include an interior layer (for example, the interior layer 371) on a side facing the electronic component, and an outer layer (for example, the outer layer 372) which is more to an outer side than the interior layer, in which a modulus of the interior layer may be lower than a modulus of the outer layer.

According to a tenth aspect of the present invention, a method of manufacturing the tire as described in any one of the first to ninth aspects may include the steps of: pasting the electronic component to the bead filler or the rubber sheet; and pasting the rubber sheet to the bead filler so as to interpose the electronic component between the bead filler and the rubber sheet.

According to an eleventh aspect of the present invention, in the method of manufacturing a tire as described in the tenth aspects, the electronic component may have a spring antenna (for example, the spring antenna 421), and the method may further include a step of disposing rubber (for example, the rubber 46) within the spring antenna, prior to the step of pasting the electronic component.

According to the present invention, it is possible to provide a tire which can maintain the function of an embedded electronic component, by arranging the electronic component at a position which is hardly affected by the stress and distortion within the tire structure.

DETAILED DESCRIPTION

First Embodiment

Figure 1:
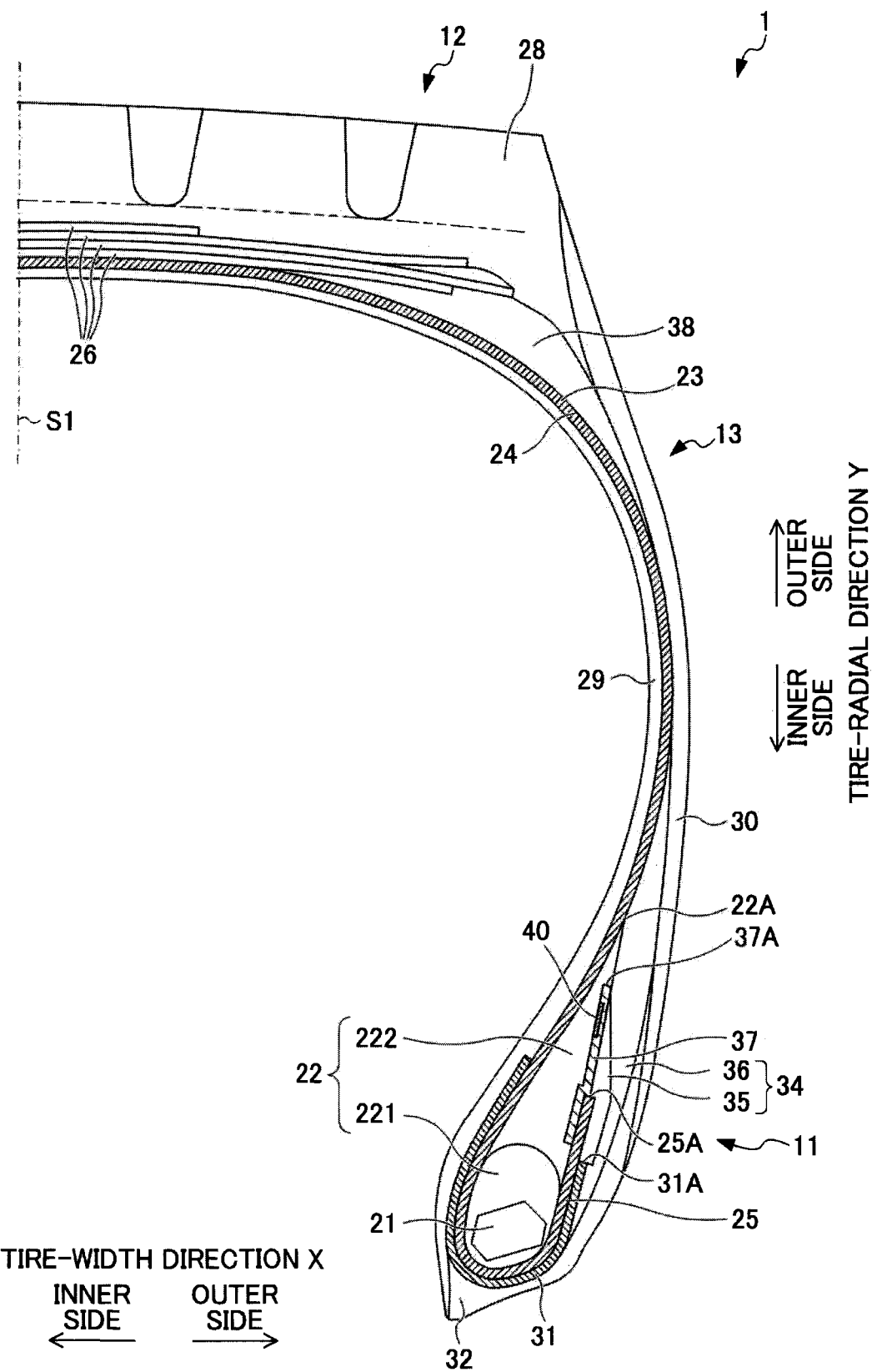
FIG. 1 is a view showing a half section in a tire-width direction of a tire according to a first embodiment of the present invention.

Hereinafter, a first embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner-side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer-side of tire-radial direction is a direction distancing from the tire rotation axis, and is the upper side of the paper plane in FIG. 1. Inner-side of tire-radial direction is a direction approaching the tire rotation axis, and is the lower side of the paper plane in FIG. 1. The same also applies to FIGS. 2 and 5.

The tire 1 is a tire for trucks and buses, for example, and includes a pair of beads 11 provided at both sides in the tire width direction, tread 12 forming a contact patch with the road surface, and a pair of sidewalls 13 which extends between the pair of beads and the tread 12.

The bead 11 includes an annular bead core 21 formed by wrapping around several times bead wires made of metal coated with rubber, and a bead filler 22 of tapered shape extending to the outer side in the tire-radial direction of the bead core 21. The bead filler 22 is configured by a first bead filler 221 which covers the outer circumference of the bead core 21, and a second bead filler 222 which is arranged on the outer side in the tire-radial direction of the first bead filler 221. The second bead filler 222 is configured from rubber with a modulus higher than an inner liner 29 and side wall rubber 30 described later. Then, the first bead filler 221 is configured from rubber of an even higher modulus than the second bead filler 222. It should be noted that the first bead filler 221 may be a form not covering the outer circumference of the bead core 21, if at least a part thereof is arranged on the outer side in the tire-radial direction of the bead core 21. In addition, the bead filler 22 may be formed from rubber of one type. In other words, it may not necessarily be divided into the first bead filler 221 and second bead filler 222. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12. As shown in FIG. 1, the carcass ply 23 includes a ply body 24 which extends from one bead core to the other bead core, and extends between the tread 12 and bead 11, and a ply folding part 25 which is folded around the bead core 21. Herein, a folding end 25A of the ply folding part 25 is positioned more to an inner side in the tire-radial direction than a tire-radial direction outside end 22A of the bead filler 22. The carcass ply 23 is configured by a plurality of ply cords extending in a tire-width direction. In addition, a plurality of ply cords is arranged side by side in a tire circumferential direction. This ply cord is configured by a metal steel cord, or an insulated organic fiber cord such as polyester or polyamide, or the like, and is covered by rubber.

In the tread 12, a plurality of layers of steel belts 26 is provided in the outer side in the tire radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although four layers of steel belts 26 are provided, the number of layered steel belt 26 is not limited thereto.

The tread rubber 28 is provided at the outer side in the tire-radial direction of the steel belt 26. A tread pattern (not illustrated) is provided to the outer surface of the tread rubber 28, and this outer surface serves as a contact surface which contacts with the road surface.

In the vicinity of the outer side in the tire-width direction of the tread 12, in a region between the carcass ply 23, and the steel belts 26/tread rubber 28, a shoulder pad 38 is provided. This shoulder pad 38 extends until a region of the outer side in the tire-radial direction of the side wall 13, and part thereof forms an interface between side wall rubber 30 described later. In other words, in the region of the outer side in the tire-radial direction of the side wall 13, a part of the shoulder pad 38 is present on the inner side in the tire width direction of the side wall rubber 30. The shoulder pad 38 consists of a rubber member having cushioning, and exhibits a cushion function between the carcass ply 23 and steel belt 26. In addition, since the shoulder pad 38 consists of rubber having a characteristic of low heat buildup, it is possible to suppress heat generation effectively, by extending until the side wall 13.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

On the inner side in the tire radial direction of the carcass ply 23 provided around the bead core 21 of the bead 11, a steel chafer 31 serving as a reinforcement ply is provided so as to cover at least part of the carcass ply 23. The steel chafer 31 also extends to the outer side in the tire-width direction of the ply folding part 25 of the carcass ply 23, and an end part 31A of this steel chafer 31 is positioned more to the inner side in the tire-width direction than the folding end 25A of the carcass ply 23. This steel chafer 31 is a metal reinforcement layer configured by metal steel cords, and is covered by rubber.

Rim strip rubber 32 is provided at the inner side in the tire-radial direction of the steel chafer 31. This rim strip rubber 32 is arranged along the outer surface of the tire, and connects with the side wall rubber 30. This rim strip rubber 32 and side wall rubber 30 are rubber members constituting the outer surface of the tire.

Then, at the outer side in the tire-radial direction of the end part 31A of the steel chafer 31, which is at the outer side in the tire-width direction of the folding part 25 of the carcass ply 23 and bead filler 22, a first pad 35 is provided. This first pad 35 is provided to the outer side in the tire-width direction of at least the folding end 25A of the carcass ply 23. The outer side in the tire-radial direction of the first pad 35 is formed so as to taper as approaching the outer side in the tire-radial direction.

Furthermore, a second pad 36 is provided so as to cover the outer side in the tire-width direction of the first pad 35. In more detail, the second pad 36 is provided so as to cover the outer side in the tire-width direction of part of the steel chafer 31, the first pad 35, part of the second bead filler 222, and part of the ply body 24 of the carcass ply 23. Then, the side-wall rubber 30 is arranged at the outer side in the tire-width direction in a region of the outer side in the tire-radial direction of the second pad 36, and the rim strip rubber 32 is arranged at an outer side in the tire-width direction in a region on the inner side in the tire-radial direction of the second pad 36. In other words, the second pad 36 is provided between the first pad 35, etc., and the rim strip rubber 32 and side wall rubber 30, which are members constituting the outer surface of the tire.

Herein, the first pad 35 and second pad 36 constitute the pad member 34, and this pad member 34 is configured by rubber of higher modulus than the modulus of the tire-radial direction outside portion of the bead filler 22 filler (second bead filler 222. In more detail, the second pad 36 is configured by rubber of higher modulus than the second bead filler 222, and the first pad 35 is configured by rubber of even higher modulus than the second pad 36. The first pad 35 and second pad 36 have a function of mitigating sudden distortion caused by the local rigidity point of change at the folding end 25A of the carcass ply 23 and the end part 31A of the steel chafer 31.

The rubber sheet 37 serving as a reinforced rubber sheet is arranged in the vicinity of the folding end 25A of the carcass ply 23, between the bead filler 22 and pad member 34. The rubber sheet 37 is arranged so as to cover the folding end 25A of the carcass ply 23 from the inner side in the tire-width direction. The rubber sheet 37 is configured from rubber of higher modulus than the second bead filler 222. More preferably, it is configured from rubber of a modulus substantially equal to that of the first pad 35.

Generally, at the folding end 25A of the carcass ply 23, stress tends to concentrate. However, by providing the rubber sheet 37 serving as the aforementioned reinforced rubber sheet, it becomes possible to effectively suppress the concentration of stress. It should be noted that, although the pad member 34 is configured from the first pad 35 and second pad 36 in the present embodiment, the pad member 34 may be configured from one member. However, as mentioned above, by configuring the pad member 34 from the first pad 35 and second pad 36, and further adopting a configuration arranging the rubber sheet 37, it is possible to more effectively suppress the concentration of stress.

It should be noted that the position of the tire-radial direction outside end 37A of the rubber sheet 37 in the present embodiment is located more to the outer side in the tire-radial direction than the tire-radial direction outside end 22A of the bead filler 22. However, the position of the tire-radial direction outside end 37A of the rubber sheet 37 may be made to substantially match the position of the tire-radial direction outside end 22A of the bead filler 22. It should be noted that the rubber sheet 37 preferably adopts a form arranged so as to cover the folding end 25A of the carcass ply 23 from the inner side in the tire-width direction as shown in FIG. 1; however, a configuration covering the folding end 25A of the carcass ply 23 from the outer side in the tire-width direction may be adopted. Even in this case, it is possible to mitigate the concentration of stress.

An RFID tag 40 is embedded as an electrical component in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna, plate-shaped antenna, and various types of rod-shaped antennas can be used. For example, it may be an antenna formed by printing a predetermined pattern on a flexible substrate. The antenna is established at an antenna length optimized according to the frequency band, etc. to be used. In a storage part inside the RFID chip, identification information such as a manufacturing number and part number is stored.

Figure 2:
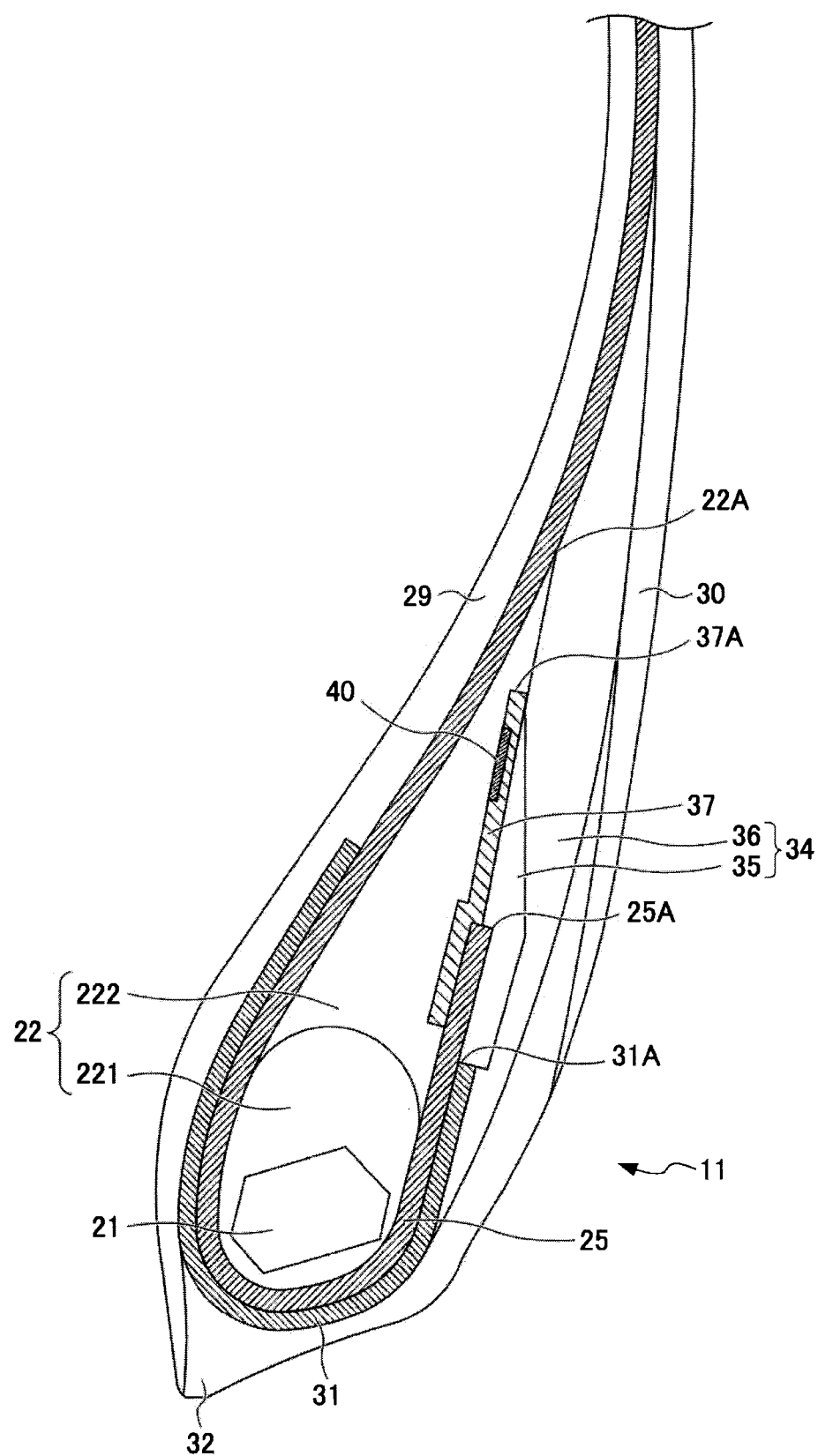
FIG. 2 is a partially enlarged cross-sectional view of a tire according to the first embodiment of the present invention.

FIG. 2 is an enlarged cross-sectional view showing the vicinity of an embedded part of the RFID tag 40 in the tire 1 of FIG. 1. As shown in FIGS. 1 and 2, the rubber sheet 37 and RFID tag 40 are arranged between the bead filler 22 and pad member 34. Then, the RFID tag 40 is arranged between the bead filler 22 and rubber sheet 37.

It should be noted that, if establishing the modulus of the second pad 36 as a reference, the side-wall rubber 30 is preferably established with a modulus of 0.4 to 0.6 times that of the second pad 36. In addition, the first pad 35 is preferably established with a modulus of 1.1 to 1.2 times that of the second pad 36. In addition, the second bead filler 22 is preferably established with a modulus of 0.7 to 0.8 times that of the second pad. By establishing such a modulus, it is possible to keep a balance of flexibility as a tire and rigidity in the vicinity of the bead 11.

Then, the rubber sheet 37 is preferably established with a modulus 1.1 times to 1.2 times that of the second pad 36. In other words, the modulus of the rubber sheet 37 preferably is established with substantially equal modulus to a portion of the pad member 34 at least covering the folding end 25A of the carcass ply 23 (first pad 35).

In this way, the modulus of the portion of the pad member (first pad 35) at least covering the folding end 25A of the carcass ply 23 and the modulus of the rubber sheet 37 both are higher than the modulus of the rubber member in the surrounding thereof. By adopting a configuration interposing the folding end 25A of the carcass ply 23 by rubber members of high modulus in this way, it becomes possible to effectively suppress the concentration of stress in this portion. Then, since the RFID tag 40 is arranged at the rubber sheet 37 which is a rubber member of high modulus, the deformation amount of the RFID tag 40 becomes smaller even in a case of the tire 1 bending. Consequently, it is possible to appropriately protect the RFID tag 40. It should be noted that, in a case of configuring the pad member 34 from one member, it is preferable for the modulus of the pad member 34 to be set higher than at least the modulus of the side-wall rubber 30. More preferably, the modulus of the pad member 34 is set to be higher than the modulus of the side-wall rubber 30 and second bead filler 222. It should be noted that the modulus of the pad member 34 may be set equal to, or lower than, the modulus of the rubber sheet 37. It should be noted that the modulus indicates 100% elongation modulus (M100) under a 23° C. atmosphere, measured in accordance with "3.7 stress at a given elongation, S" of JIS K6251:2010.

As mentioned above, normally, in a case of the boundary surface of two substances being a surface extending from the folding end 25A of the carcass ply 23, distortion tends to occur at this surface. However, in the present embodiment, since the rubber sheet 37 is arranged so as to cover the folding end 25A of the carcass ply 23, more to the outer side in the tire-radial direction than the folding end 25A of the carcass ply 23 becomes a portion which hardly receives the influence of distortion.

Figure 3:
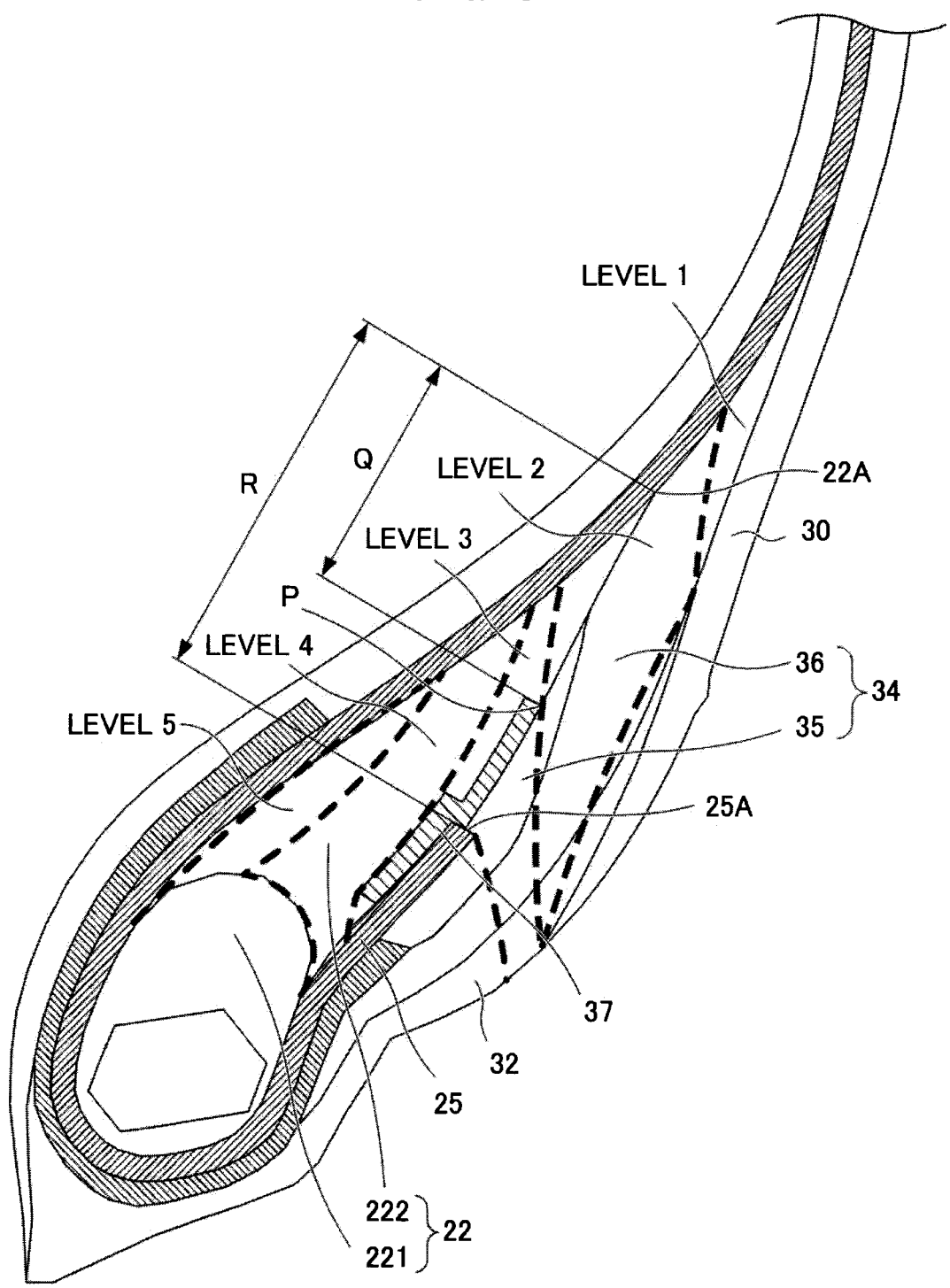
FIG. 3 is a view showing results of an in-plane distribution simulation of strain energy in a case of applying load to the tire.

FIG. 3 is a view showing the results of in-plane distribution simulation of strain energy, in a case of assembling the tire to a rim, and applying 100% load. The enlarged cross-sectional view shown in FIG. 3 displays by dividing the region in five, according to the magnitude of the strain energy. Herein, a region having the highest strain energy is defined as level 5, a region having high strain energy is defined as level 4, a region in which the strain energy somewhat declined is defined as level 3, a region in which the strain energy further declined is defined as level 2, and the region in which the strain energy declined the most is defined as level 1. FIG. 3 displays by dividing the regions with bold dotted lines as the boundary.

The region more to the outer side in the tire-radial direction than the folding end 25A of the carcass ply 23 at the boundary surface between the bead filler 22 and pad member 34 and vicinity thereof becomes a region of mostly level 2 to 3, and thus there is little strain energy. Consequently, upon arranging the RFID tag 40, this region is a preferable region. It should be noted that, in the present embodiment (refer to FIG. 2), although the rubber sheet 37 extends more to the outer side in the tire-radial direction than this simulation model, since the basic configurations of arranging and reinforcing the rubber sheet 37 are the same, the strain energy in the vicinity of the rubber sheet 37 becomes equal to FIG. 3, or smaller.

It should be noted that, in the tire-width direction cross-sectional view shown in FIGS. 1 to 3, when defining the distance from the tire-radial direction outside end 22A of the bead filler 22 until the folding end 25A of the carcass ply 23 as a reference distance R, the RFID tag 40 is preferably arranged within a region (region Q) of range Q from the position of the tire-radial direction outside end 22A of the bead filler 22 until a position P (refer to FIG. 3) which is 60% of the reference distance towards the folding end 25A of the carcass ply 23. Within the region of this range Q, the strain energy of the boundary surface between the bead filler 22 and the pad member 34 and the vicinity thereof become mostly level 2, and upon arranging the RFID tag 40, becomes a very preferable region. Consequently, it is preferable to extend the rubber sheet 37 until this region, and arrange the RFID tag 40 in this region.

It should be noted that, so long as within the region of this range Q, it will be a position distanced a certain extent from the bead core 21 made of metal, which has a possibility of adversely affecting communication. Herein, the bead core 21 is formed in a ring shape by winding in layers of metal bead wires, and thus is a metal member having a particularly high possibility of adversely affecting communication. In addition, the vicinity of the rubber sheet 37 also hardly receives influence relative to external damage, due to being a position distanced a certain extent from the outer surface of the tire 1. Furthermore, since the outer side in the tire-width direction is protected by the pad member 34 having high modulus, it hardly receives influence relative to external damage also from this point.

Figure 4:
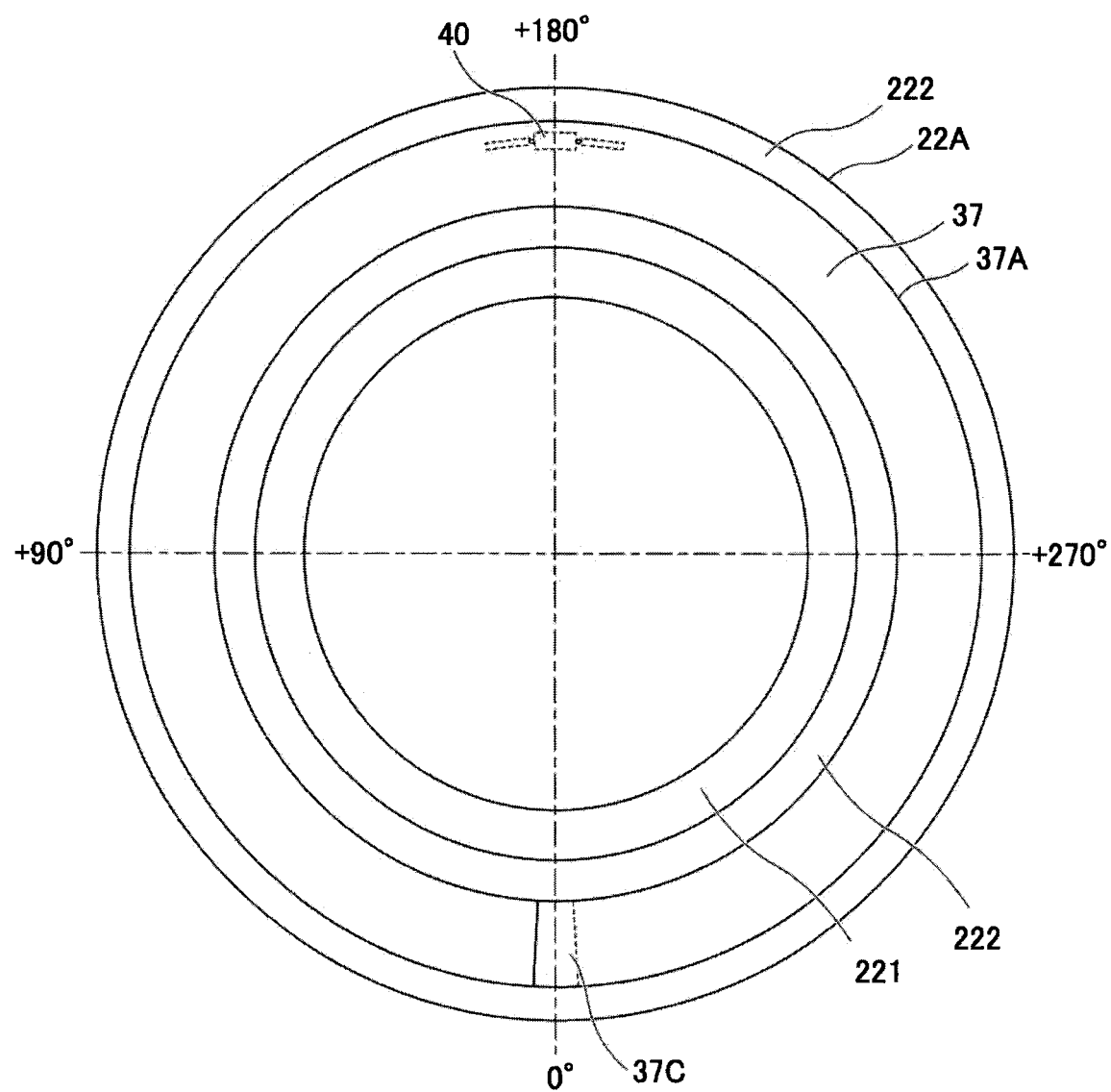
FIG. 4 is a view showing a state of pasting the RFID tag and rubber sheet to the bead filler in the tire according to the first embodiment of the present invention.

Next, the manufacturing process of the tire 1 will be explained. FIG. 4 is a view of the bead filler 22 in the manufacturing process when viewing from the outer side in the tire-width direction, and is a view showing a state of pasting RFID tag 40 and rubber sheet 37 to the bead filler 22. Herein, since the RFID tag 40 is covered by the rubber sheet 37, it is illustrated by dotted line.

As shown in FIG. 4, the bead filler 22 constituting the bead 11 and the rubber sheet 37 are respectively formed in an annular shape. Then, the rubber sheet 37 has a joint part 37C. In the present embodiment, as shown in FIG. 4, the outside diameter of the outer circumference 37A of the rubber sheet 37 (tire-radial direction outside end 37A in the tire-width direction cross-sectional view in FIG. 2) is somewhat smaller than the outside diameter of the outer circumference 22A of the bead filler 22 (tire-radial direction outside end 22A in the tire-width direction cross-sectional view in FIG. 2). However, the outside diameters of both may be substantially matching.

The RFID tag 40 is attached prior to the vulcanization step in the manufacturing process of the tire 1. In the present embodiment, the RFID tag 40 is pasted to the bead filler 22 prior to being vulcanized, and subsequently, the rubber sheet 37 is pasted so as to cover the RFID tag 40. In other words, the rubber sheet 37 is pasted to the bead filler 22 so as to interpose the RFID tag 40 between the bead filler 22 and rubber sheet 37. At this time, the bead filler 22 and rubber sheet 37, due to being in the raw rubber state prior to vulcanization, can be pasted using the adhesiveness thereof. Alternatively, in the case of the adhesiveness being low or the like, it may be pasted using an adhesive or the like.

It should be noted that the rubber sheet 37 is formed in an annular shape by one end side and another end side of a long sheet being joined at the joint part 37C. Then, the RFID tag 40 is arranged between the annular bead filler 22 and annular rubber sheet 37 within a range of +90 to +270 degrees, when defining the position of the joint part 37C of the rubber sheet 37 as 0 degrees, with the center of the bead filler 22 as a reference. More preferably, it is arranged a region in the neighborhood of the position at +180 degrees, as shown in FIG. 4. By arranging the RFID tag 40 at a position reliably distanced from the joint point 37C of the rubber sheet 37 in this way, since the portion which would be the cause for fluctuation in thickness of the rubber member does not overlap, the uniformity of the tire 1 improves.

Each rubber member and the like constituting the tire is assembled in this way, whereby the green tire is formed. Subsequently, the green tire in which each constituent member including the RFID tag 40 is assembled is vulcanized in the vulcanization step to produce the tire.

It should be noted that the rubber sheet 37 is formed in an annular shape, so as to assume a form covering the folding end 25A of the carcass ply 23 over the entire circumference in the state after green tire assembly. Consequently, it becomes possible to suppress the concentration of stress over the entire circumference. As a result thereof, the stress received by the RFID tag 40 also becomes smaller.

It should be noted that, as a modified example of the manufacturing process of the tire 1, the following such manufacturing process may be adopted. In other words, the RFID tag 40 is pasted to the side of the rubber sheet 37, and subsequently, the bead filler 22 and rubber sheet 37 are assembled so that the RFID tag 40 is sandwiched between the bead filler 22 and rubber sheet 37. Even in a case of adopting such a process, the RFID tag 40 is arranged between the bead filler 22 and rubber sheet 37.

In this way, in the present embodiment, since it is possible to paste the RFID tag 40 using rubber in the raw rubber state during tire manufacture, the assembly work of the RFID tag 40 in the manufacturing process of the tire is easy. In particular, since the bead filler 22 has a certain extent of rigidity even in the raw rubber state, the attaching work of the RFID tag 40 is easy.

It should be noted that the RFID tag 40 embedded in the tire 1 often has a longitudinal direction if including an antenna, as shown in FIG. 4. Such an RFID tag 40 is preferably embedded in the tire 1 so that the longitudinal direction thereof becomes the direction of the tangential line relative to the circumferential direction of the tire 1, for example, i.e. direction orthogonal to the paper plane in the cross-sectional views of FIGS. 1 and 2. By embedding in this way, stress will hardly act on the RFID tag 40 when the tire 1 deforms.

Herein, in the attaching step of the RFID tag 40, it is possible to simply arrange the RFID tag 40 in the aforementioned direction, by establishing the shape of the outer circumference 22A of the annular-shaped bead filler 22 as a reference. In other words, as shown in FIG. 4, it can be pasted so that the longitudinal direction of the RFID tag 40 runs along the circumferential direction of the outer circumference 22A of the annular-shaped bead filler 22, or so as to substantially match the direction of a tangential line relative to the outer circumference 22A. By way of this method, it is possible to arrange the RFID tag 40 simply and accurately in the aforementioned direction, without giving special markers. In addition, the thickness of the bead when the tire is completed is also stable, and the variation in manufacture also decreases.

It should be noted that the RFID tag 40 may be sandwiched between the bead filler 22 and pad member 34, in a state covered by a protective member of rubber or the like; however, it may be sandwiched directly between the bead filler 22 and pad member 34 without covering by a protective member. So long as interposing the uncoated RFID tag 40 directly between the bead filler 22 and pad member 34, the fluctuation in thickness of the rubber member of a portion in which the RFID tag 40 is interposed will decrease, and thus the uniformity of the tire 1 improves. In addition, in the work of interposing the RFID tag 40 between the bead filler 22 and pad member 34, the removal of air also becomes easier by the amount decreasing the volume of the interposed object. In addition, the work time becomes shorter by there no longer being a step of covering the RFID tag 40 by a protective member.

It should be noted that, in the present embodiment, although the RFID tag 40 is embedded in the tire as an electronic component, the electronic component embedded in the tire is not limited to an RFID tag. For example, it may be various electronic components such as a sensor which carries out wireless communication. In addition, since the electronic component handles electrical information such as sending and receiving of electrical signals, there is a possibility of the performance declining due to metal components being present in the vicinity thereof. In addition, there is a possibility of the electronic component being damaged by excessive stress being applied. Consequently, even in the case of embedding various electronic components in a tire, it is possible to obtain the effects of the present invention. For example, the electronic component may be a piezoelectric element or strain sensor.

According to the tire 1 of the present embodiment, the following effects are exerted.

(1) The tire 1 according to the present embodiment includes: the bead core 21; the bead filler 22 extending to the outer side in the tire-radial direction of the bead core 21; the carcass ply 23 which extends from the bead core 21 to another bead core 21, and is folded back around the bead core 21; and the rubber sheet 37 which covers the folding end 25A of the carcass ply 23 which was folded back, in which the RFID tag 40 is provided between the bead filler 22 and rubber sheet 37. By the RFID tag 40 being arranged at a position which hardly receives the influence of stress and distortion in the tire structure in this way, it is possible to retain the function of the RFID tag 40.

(2) The rubber sheet 37 according to the present embodiment is formed in an annular shape, and covers the folding end 25A of the carcass ply 23 over the entire circumference. It thereby becomes possible to suppress the stress occurring in the vicinity of the folding end 25A of the carcass ply 23 over the entire circumference, and as a result thereof, the stress received by the RFID tag 40 also becomes smaller.

(3) The bead filler 22 according to the present embodiment is formed in an annular shape, the rubber sheet 37 is formed in an annular shape by one end side and another end side of a long sheet being joined, and with the center of the bead filler 22 as a reference, when defining a position being joined as 0 degrees, the RFID tag 40 is provided between the annular bead filler 22 and annular rubber sheet 37 within a range of +90 to +270 degrees. By arranging the RFID tag 40 at a position reliably distanced from the joint 37C of the rubber sheet 37 in this way, since the portion which would be a cause for the fluctuation in thickness of the rubber member no longer overlaps, the uniformity of the tire 1 improves. Consequently, the quality of the tire when completed also improves.

(4) In the tire 1 according to the present embodiment, the uncoated RFID tag 40 is arranged between the bead filler 22 and rubber sheet 37. By interposing the uncoated RFID tag 40 directly between the bead filler 22 and rubber sheet 37 in this way, the fluctuation in thickness of the rubber member at a portion at which interposing the RFID tag 40 decreases, and thus the uniformity of the tire 1 improves. Consequently, the quality of the tire when completed also improves.

(5) The tire 1 according to the present embodiment includes the pad member 34 arranged at the outer side in the tire-width direction of the folding end 25A of the carcass ply 23, and the rubber sheet 37 and RFID tag 40 components are arranged between the bead filler 22 and pad member 34. The RFID tag 40 is thereby even less influenced by distortion.

(6) In the tire 1 according to the present embodiment, the modulus of at least a portion of the pad member 34 (first pad 35) covering the folding end 25A of the carcass ply 23 and the modulus of the rubber sheet 37 are higher than the modulus of the rubber member in the surroundings. According to such a configuration, since it becomes a form interposing the folding end 25A of the carcass ply 23 by rubber members of high modulus, it becomes possible to effectively suppress the concentration of stress at this portion. Then, since the RFID tag 40 is arranged at the rubber sheet 37, which is a rubber member of high modulus, the deformation amount of the RFID tag 40 becomes smaller even in a case of the tire 1 bending. Consequently, the RFID tag 40 is appropriately protected.

(7) A method of manufacturing a tire according to the present embodiment includes a step of pasting the RFID tag 40 to the bead filler 22 or rubber sheet 37, and pasting the rubber sheet 37 to the bead filler 22 so as to interpose the RFID tag 40 between the bead filler 22 and rubber sheet 37. It is thereby possible to arrange the RFID tag 40 at a position which hardly receives the influence of stress and distortion in the tire structure.

Second Embodiment

Figure 5:
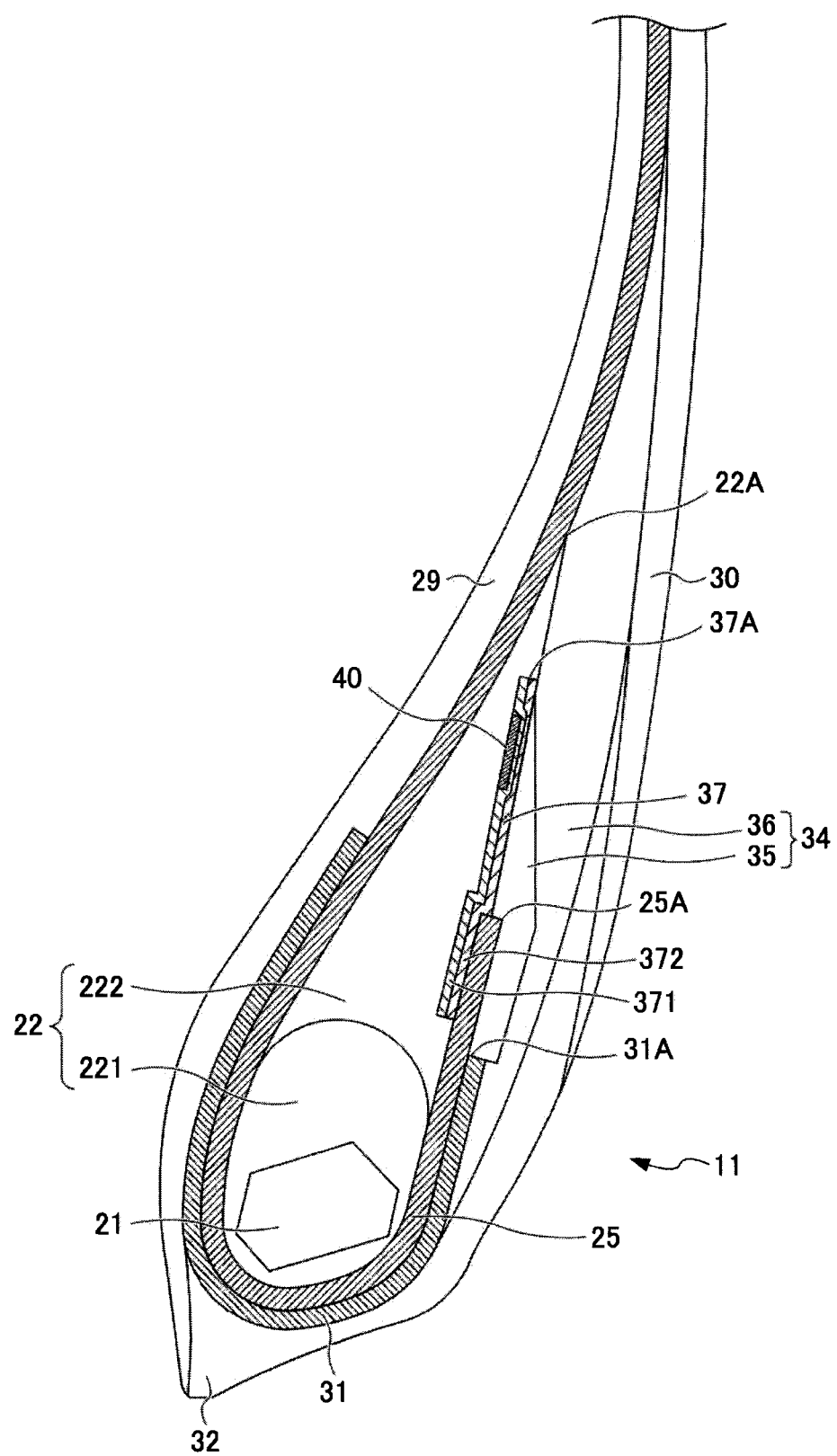
FIG. 5 is a partially enlarged cross-sectional view of a tire according to a second embodiment of the present invention.

Next, a tire according to a second embodiment will be explained while referencing FIG. 5. It should be noted that the same reference symbol will be attached for the same configurations as the first embodiment in the following explanation, and detailed explanations thereof will be omitted.

In the present embodiment, the rubber sheet 37 is formed by a plurality of layers. More specifically, the rubber sheet 37 includes an interior layer 371 on a side facing the RFID tag 40, and an outer layer 372 positioned on a side more distanced from the RFID tag 40 than the interior layer 371. Then, the modulus of the interior layer 371 is lower than the modulus of the outer layer 372. Since the modulus of the rubber member is set so as to become lower as approaching the RFID tag 40 in this way, it is possible to appropriately protect the RFID tag 40.

In other words, due to the existence of the outer layer 372 of relatively high modulus, it becomes possible to suppress the deformation amount of the peripheral part of the RFID tag 40, even in a case of the tire 1 bending. Furthermore, due to the existence of the interior layer 371 of relatively low modulus, it becomes possible to absorb the difference between the deformation amount of the RFID tag 40 and the deformation amount of the outer layer 372. It should be noted that it is preferable for the modulus of the outer layer 372 to be established as a modulus of 1.1 times to 1.2 times that of the second pad 36. In other words, the modulus of the outer layer 372 is preferably established as a modulus substantially equal to the modulus of a portion (first pad 35) at least covering the folding end 25A of the carcass ply 23 in the pad member 34. It should be noted that it is preferable for the modulus of the interior layer 371 to be established as a modulus substantially equivalent to the second bead filler 222. Alternatively, rubber of lower modulus than the second bead filler 222 may be used in consideration of effectively absorbing the difference in deformation amount. It should be noted that the rubber sheet 37 only needs to include at least two layers having the functions of the aforementioned interior layer and outer layer, and may be formed by three or more layers, for example.

According to the tire related to the present embodiment, the following effects are exerted in addition to the above-mentioned (1) to (7).

(8) The rubber sheet 37 includes the interior layer 371 on a side facing the RFID tag 40, and the outer layer 371 more to the outer side than the interior layer, and the modulus of the interior layer 371 is lower than the modulus of the outer layer 372. By the existence of the outer layer 372 of relatively high modulus, it thereby becomes possible to suppress the deformation amount at the peripheral part of the RFID tag 40, even in a case of the tire 1 bending. Furthermore, by the existence of the interior layer 371 of relatively low modulus, it becomes possible to absorb the difference between the deformation amount of the RFID tag 40 and the deformation amount of the outer layer 372. Consequently, it is possible to appropriately protect the RFID tag 40.

Third Embodiment

Next, a tire according to a third embodiment will be explained while referencing FIGS. 6A to 6C. It should be noted that the same reference symbol will be attached for the same configurations as the first embodiment in the following explanation, and detailed explanations thereof will be omitted.

Figure 6A:
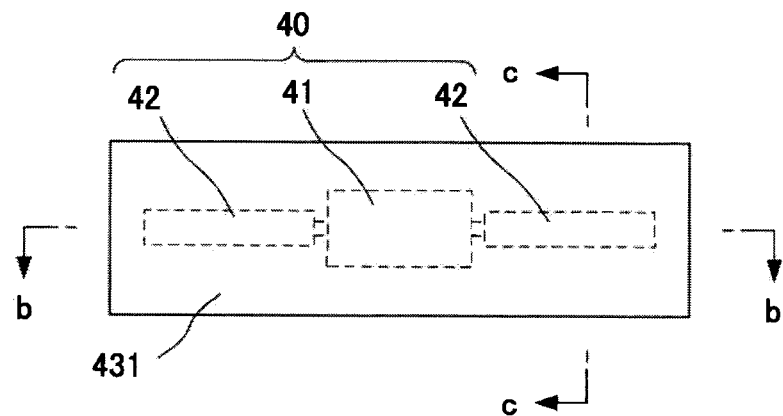
FIG. 6A is a view showing an RFID tag covered by a coating rubber sheet, in a tire according to a third embodiment of the present invention.
Figure 6B:
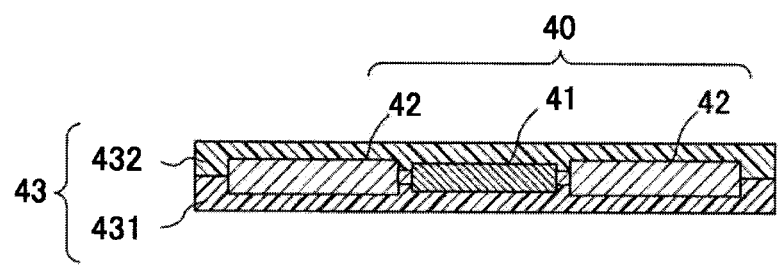
FIG. 6B is a view showing along the cross section b-b in FIG. 6A.
Figure 6C:
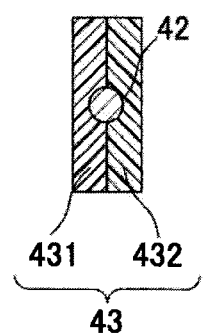
FIG. 6C is a view showing along the cross section c-c in FIG. 6A.

FIG. 6A is a view showing the RFID tag 40 covered by a coating rubber sheet constituting the protective member 43. In FIG. 6A, the RFID tag 40 is covered and hidden by the coating rubber sheet 431 described later. FIG. 6B is a cross-sectional view along the line b-b in FIG. 6A, and FIG. 6C is a cross-sectional view along the line c-c in FIG. 6A. In the present embodiment, the RFID tag 40 is covered by the coating rubber sheets 431, 432 constituting the protective member 43, as shown in FIGS. 6A to 6C.

The RFID tag 40 includes an RFID chip 41 and antenna 42 for performing communication with external equipment. As the antenna 42, a coil-shaped spring antenna, plate-shaped antenna, and various types of rod-shaped antennas can be used. When considering the communicability and flexibility, a coil-shaped spring antenna is the most preferable.

The protective member 43 is configured from the two coating rubber sheets 431, 432 which interpose to protect the RFID tag 40.

As the rubber employed in the protective member 43, rubber of lower modulus than at least the rubber sheet 37 is used. For example, the coating rubber sheets 431, 432 constituting the protective member 43 are preferably established with a modulus of 0.5 to 0.8 times that of the rubber sheet 37. However, in order to impart a certain level of strength, it is preferable to use rubber of higher modulus than the side-wall rubber 30. More preferably, it is preferable to establish with a modulus substantially equal to the second bead filler 222. Alternatively, rubber of lower modulus than the second bead filler 222 may be used in consideration of effectively absorbing the deformation amount.

Similarly to the first embodiment, by arranging the RFID tag 40 near the rubber sheet 37 having high modulus, even in the case of the tire 1 bending, it becomes possible to suppress the deformation amount at the peripheral part of the RFID tag 40. Furthermore, by covering the RFID tag 40 by way of the protective member 43 having low modulus, the protective member 43 becomes able to absorb the deformation amount so that deformation of the rubber sheet 37 does not directly transmit to the RFID tag 40.

In addition, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a coating rubber sheet in the vulcanized state may be used. The coating rubber sheet in a vulcanized state does not plastically deform as would raw rubber, and thus can appropriately protect the RFID tag 40.

In addition, as the protective member 43, an organic fiber layer from polyester fibers or polyamide fibers may be provided. It is also possible to embed an organic fiber layer in the two coating rubber sheets 431, 432.

So long as configuring the protective member 43 by way of two coating rubber sheets in this way, since it is possible to thinly form the RFID tag 40 including the protective member 43, it is favorable upon embedding in the tire 1. In addition, when assembling the RFID tag 40 in the constituent members of the tire 1 prior to vulcanizing, the RFID tag 40 covered by the coating rubber sheet can be very easily installed. For example, at the desired position of members such as the bead filler 22 prior to vulcanization, it is possible to appropriately paste the RFID tag 40 covered by the coating rubber sheets using the stickiness of raw rubber. In addition, by also establishing the coating rubber sheets as raw rubber prior to vulcanization, it is possible to more easily paste also using the stickiness of the rubber sheets themselves.

However, the protective member 43 can be employed in various forms, not limited to the form configured by two coating rubber sheets. For example, so long as the coating rubber sheet constituting the protective member covers at least part of the RFID tag 40, effects such as an improvement in workability during the manufacturing process and stress mitigation are obtained. In addition, for example, it may be a configuration wrapping one coating rubber sheet over the entire circumference of the RFID tag 40, or a configuration adhering a protective member in the form of a potting agent having high viscosity over the entire circumference of the RFID tag 40. Even if such a configuration, it is possible to appropriately protect the RFID tag 40.

It should be noted that the RFID tag 40 covered by the protective member 43 is embedded in the tire 1 so that the longitudinal direction thereof is the direction of a tangent line relative to the circumferential direction of the tire 1, i.e. direction orthogonal to the paper plane in the cross-sectional views of FIGS. 1 and 2. Alternatively, it is embedded in the tire in a shape running along the circumferential direction of the tire. In addition, the coating rubber sheets 431, 432 are embedded in the tire 1 in a form such that is aligned in the tire-width direction. In other words, in the manufacturing process, one side of either of the coating rubber sheets 431, 432 is pasted to a constituent member of the tire prior to vulcanization, e.g., the bead filler 22. Then, the RFID tag 40 covered by the protective member 43 is arranged between the bead filler 22 and rubber sheet 37. By establishing such a form, stress hardly acts on the RFID tag 40 also when the tire deformed. In addition, the work for attaching the RFID tag 40 covered by the protective member 43 in the manufacturing process becomes simple.

Herein, in the attaching process of the RFID tag 40, by establishing the outer circumference 22A of the annular bead filler 22 (refer to FIG. 4) as a reference, it is possible to easily arrange the RFID tag 40 covered by the protective member 43 in the aforementioned direction. For example, the coating rubber sheets 431, 432 covering the RFID tag 40 are pasted so as to run along the circumferential direction of the outer circumference 22A of the annular-shaped bead filler 22. At this time, the coating rubber sheets 431, 432 formed by the raw rubber can also be pasted while deformed so as to run along the outer circumference of the bead filler 22. Using a flexible coil-shaped spring antenna or the like as the antenna of the RFID tag 40, a form such that the antenna also deforms following the deformation of the coating rubber sheets 431, 432 may be established. Alternatively, with the reference of the outer circumference of the annular-shaped bead filler 22, the longitudinal direction of the coating rubber sheets 431, 432 covering the RFID tag 40 may be pasted so as to substantially match the tangential direction of the outer circumference of the annular-shaped bead filler 22. By way of this method, it is possible to arrange the RFID tag 40 covered by the protective member 43 simply and accurately in the aforementioned direction, without giving special markers. In addition, the thickness of the bead when the tire is completed is also stable, and the variation in manufacture also decreases.

According to the tire related to the present embodiment, the following effects are exerted in addition to the above-mentioned (1) to (8).

(9) The RFID tag 40 of the present embodiment is covered by the coating rubber sheets 431, 432, and the RFID tag 40 covered by the coating rubber sheets 431, 432 is arranged between the bead filler 22 and rubber sheet 37. Consequently, it is possible to appropriately protect the RFID tag 40. (10) The modulus of the coating rubber sheets 431, 432 of the present embodiment is lower than the modulus of the rubber sheet 37. By covering the RFID tag 40 by the coating rubber sheets 431, 432 of low modulus in this way, it becomes possible for the coating rubber sheets 431, 432 to absorb the deformation amount so that deformation of the rubber sheet 37 does not directly transmit to the RFID tag 40.

Fourth Embodiment

Next, a tire according to a fourth embodiment will be explained while referencing FIGS. 7 to 13. It should be noted that the same reference symbol will be attached for the same configurations as the first and third embodiments in the following explanation, and detailed explanations thereof will be omitted. The present embodiment is a particularly favorable embodiment in the case of the antenna of the RFID tag 40 being a coil-shaped spring antenna.

In the RFID tag 40 of the present embodiment, a coil-shaped spring antenna 421 having high communicability and flexibility can be used as the antenna. The spring antenna 421 is set to an antenna length which was optimized according to the frequency band, etc. to be used.

In the present embodiment, prior to interposing the RFID tag 40 by the two coating rubber sheets 431, 432 constituting the protective member 43, the rubber is arranged within the spring antenna 421. More preferably, rubber is filled into the spring antenna, so that air will not remain as much as possible. This process and the reason for adopting this process will be explained using FIGS. 7 to 13.

Figure 7:
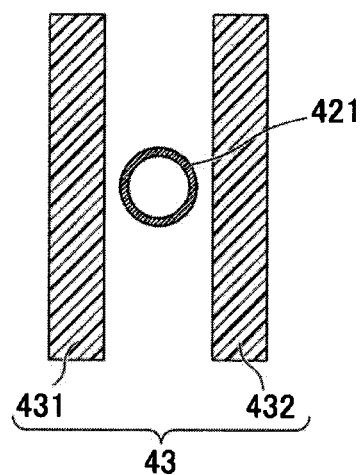
FIG. 7 is a view showing a cross section prior to interposing the RFID tag by a coating rubber sheet, in a case of not filling rubber into a spring antenna.
Figure 8:
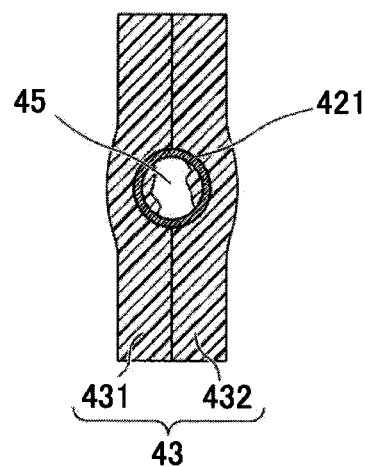
FIG. 8 is a view showing a cross section after interposing the RFID tag by coating rubber sheets in a case of not filling rubber into the spring antenna.

First, a state of the surroundings of the RFID tag 40 in a case of not filling rubber into the spring antenna 421 will be explained as a reference example using FIGS. 7 to 9. FIG. 7 is a view showing a cross section of the spring antenna 421, and coating rubber sheets 431, 432, prior to interposing the RFID tag 40 by the coating rubber sheets 431, 432. FIG. 8 is a view showing a cross section of the spring antenna 421, and coating rubber sheets 431, 432, after interposing the RFID tag 40 by the coating rubber sheets 431, 432.

As shown in FIG. 8, in this reference example, since rubber is not filled into the spring antenna 421 in advance, a certain amount of air 45 may remain within the spring antenna 421 after interposing by the coating rubber sheets 431, 432. If air remains in this way, the integrity of the coating rubber sheets 431, 432 and the spring antenna 421 becomes insufficient, and when the tire deforms, there is concern over the spring antenna 421 not following the motion of the rubber, and the RFID tag 40 having the spring antenna 421 being damaged.

It should be noted that raw rubber before vulcanization is used as the coating rubber sheets 431, 432 herein. Consequently, by pushing the coating rubber sheets 431, 432 from both sides, the coating rubber sheets 431, 432 sticks to some extent inside the spring antenna as shown in FIG. 8. However, very large amounts of time and labor are required in order to stick the coating rubber sheets 431, 432 until the inside of the spring antenna is completely embedded.

Figure 9:
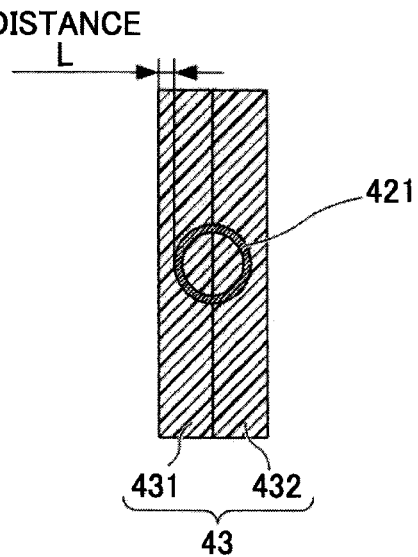
FIG. 9 is a view showing a cross section after interposing the RFID tag by a coating rubber sheet, in a case of not filling rubber into a spring antenna.

Then, even if assuming a case of taking time and sticking the rubber sheets until the inside of the spring antenna is embedded, the distance L between the outer circumferential part of the spring antenna 421 and the outer surface of the coating rubber sheets 431, 432 becomes very short, as shown in FIG. 9. In addition, it is difficult to stabilize this distance L, and locally thin portions can occur. Consequently, the protection of the RFID tag 40 by the coating rubber sheets 431, 432 becomes insufficient, and during vulcanization, there is a possibility of the coating rubber sheets 431, 432 being damaged.

Therefore, in the present embodiment, prior to interposing the RFID tag 40 by the coating rubber sheets 431, 432, the rubber is arranged within the spring antenna 421, as shown in FIGS. 10 to 13. More preferably, rubber is filled within the spring antenna so that air does not remain as much as possible. It should be noted that the views shown on the right sides of FIGS. 10 to 13 are views showing a transverse section of the spring antenna 421 and the surrounding thereof.

Figure 10:
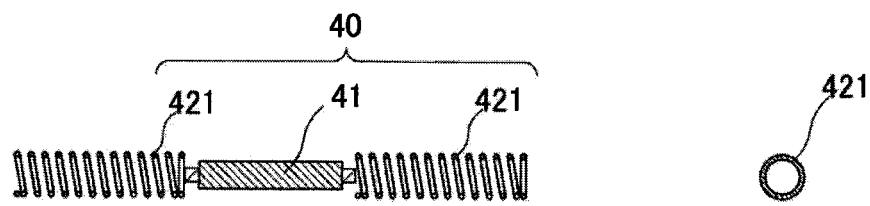
FIG. 10 is a view showing the RFID tag prior to filling rubber inside a spring antenna in a tire according to a fourth embodiment of the present invention.
Figure 10:
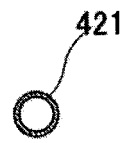
Figure 11:
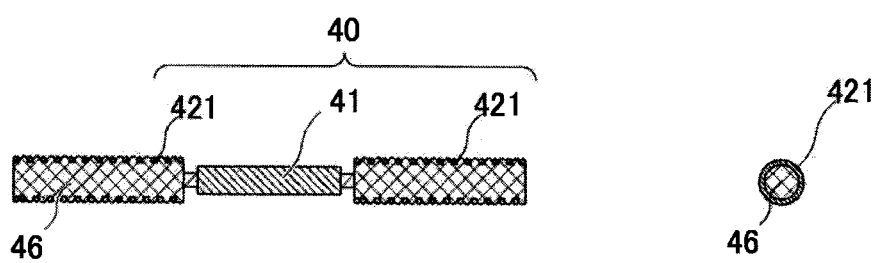
FIG. 11 is a view showing the RFID tag after filling rubber inside a spring antenna in a tire according to the fourth embodiment of the present invention.
Figure 11:
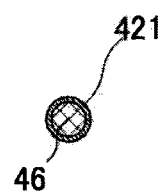

FIG. 10 is a view showing a state prior to filling the rubber 46 into the spring antenna 421, and FIG. 11 is a view showing a state after filling the rubber 46 into the spring antenna 421. The rubber 46 is embedded so as to be almost the same outside diameter as the outer circumferential face of the spring antenna 421. Then, in the case of the rubber 46 escaping from the outer circumferential face of the spring antenna 421, it is preferable to wipe off this portion. In other words, the outer circumferential face of the rubber 46 is preferably molded so as to become substantially the same surface as the outer circumferential face of the spring antenna 421. It should be noted that the rubber 46 may be filled into the spring antenna 421, and the outer circumference of the spring antenna 421 may be thinly wrapped by the rubber 46. On the other hand, if thickly wrapping the spring antenna 421 by the rubber 46, in addition to the flexibility of the spring antenna 421 being harmed, the dimension in the width direction formed by the coating rubber sheets 431, 432 after interposing the RFID tag 40 becomes larger, which is not preferable. It should be noted that the rubber 46 may be embedded so as to become substantially the same outside diameter as the inner circumferential face of the spring antenna 421. It is desirable for the outer circumferential part of the rubber 46 to be located within the range of the inner circumferential face and outer circumferential face of the spring antenna 421.

Herein, rubber having flexibility is used as the rubber 46 in order to ensure the flexibility of the spring antenna 421. However, it is preferable to use rubber of a modulus higher than the coating rubber sheets 431, 432 as the rubber 46, in consideration of the workability, etc. It should be noted that preferably unvulcanized rubber is used as the rubber 46 arranged within the spring antenna 421. By establishing the rubber 46 and coating rubber sheets 431, 432 as unvulcanized rubber and vulcanizing simultaneously, the integrity of the rubber 46, coating rubber sheets 431, 432 and spring antenna 421 rises. In addition, the rubber 46, and coating rubber sheets 431, 432 are more preferably established as the same type of rubber. It should be noted that, by emphasizing the flexibility of the spring antenna 421, rubber of lower modulus than the coating rubber sheets 431, 432 may be used as the rubber 46. In addition, rubber of substantially the same modulus, and rubber of the same material may be used. It should be noted that vulcanized rubber may be used as the rubber 46 arranged within the spring antenna 421. In addition, rubber-based adhesive, rubber-based filler, etc. can also be used. Taking account of configuring so as not to leave air within the spring antenna 421 as much as possible, while ensuring flexibility, it is possible to adopt various rubber-based materials. As the arranging operation of the rubber 46, various methods can be adopted; however, for example, it is also possible to inject rubber into the spring antenna 421 using a syringe. In this case, a set appropriate amount of the rubber 46 may be filled using a syringe. In addition, after filling a large amount of the rubber 46, portions protruding from the outer circumference of the spring antenna 421 may be wiped off.

Figure 12:
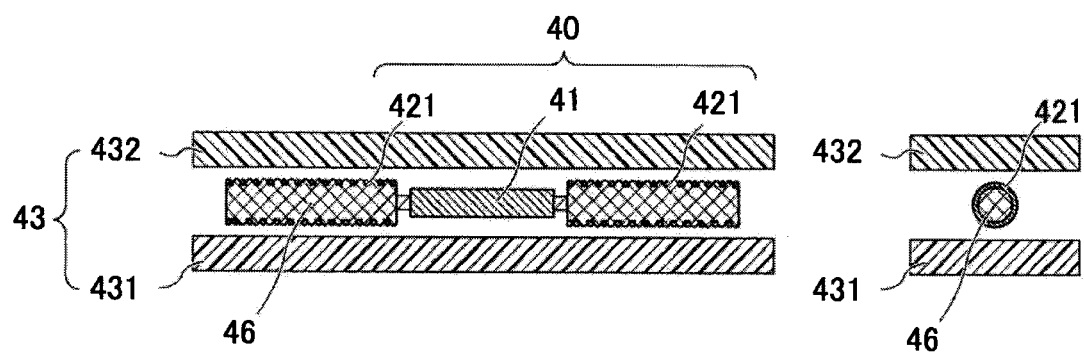
FIG. 12 is a view showing the RFID tag prior to interposing by coating rubber sheets, in the tire according to the fourth embodiment of the present invention.
Figure 13:
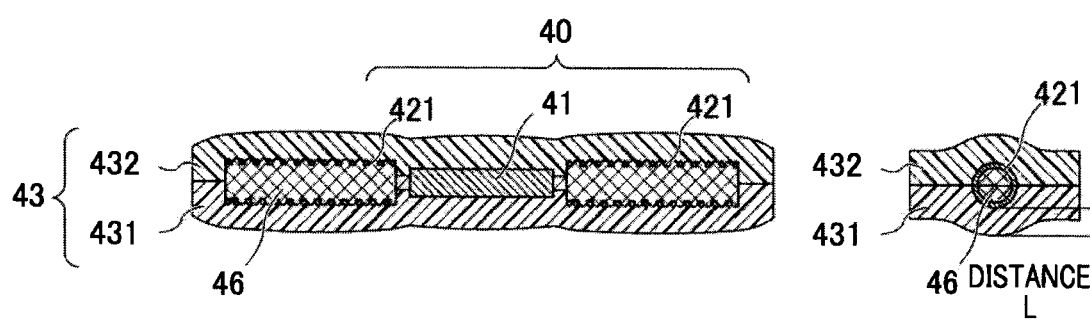
FIG. 13 is a view showing the RFID tag interposed by a coating rubber sheet, in the tire according to the fourth embodiment of the present invention.

FIG. 12 is a view showing a state prior to interposing the RFID tag 40 into which the rubber 46 is filled in the spring antenna 421, by the coating rubber sheets 431, 432, and FIG. 13 is a view showing a state after interposing by the coating rubber sheets 431, 432.

As shown in FIG. 13, according to the present embodiment, since the rubber 46 is filled in advance into the spring antenna 421, no air pockets exist between the coating rubber sheets 431, 432. Consequently, since it is unnecessary to be concerned over air pockets, the process of interposing the RFID tag 40 by the coating rubber sheets 431, 432 also becomes easy. In addition, by the rubber 46 being arranged within the spring antenna 421, the integrity of the spring antenna 421, rubber 46, and coating rubber sheets 431, 432 rises, and when the tire deforms, the spring antenna 421 follows the movement of the rubber. Consequently, the durability of the RFID tag 40 having the spring antenna 421 also improves.

In addition, according to the present embodiment, the distance L between the outer circumferential part of the spring antenna 421 and the outer circumferential face of the coating rubber sheets 431, 432 stabilizes. In other words, a distance close to the thickness of the coating rubber sheets 431, 432 is generally secured as this distance L. Consequently, the RFID tag 40 is sufficiently protected by the coating rubber sheets 431, 432. In the present embodiment, the RFID tag 40 interposed by the coating rubber sheets 431, 432 is fixedly set up at the bead filler 22, etc., and subsequently, the green tire is vulcanized.

It should be noted that, in the present embodiment, the RFID tag 40 into which the rubber 46 was filled in advance within the spring antenna 421 is arranged so as to be sandwiched between the bead filler 22 and rubber sheet 37 upon being covered by the coating rubber sheets 431, 432. However, the RFID tag 40 in which the rubber 46 was filled in advance into the spring antenna 421 may be interposed directly between the bead filler 22 and rubber sheet 37, without covering by the coating rubber sheets 431, 432. By interposing the uncoated RFID tag 40 directly between the bead filler 22 and rubber sheet 37 in this way, the fluctuation in thickness of the rubber member at a portion interposing the RFID tag 40 decreases, and thus the uniformity of the tire 1 improves. In addition, since the rubber 46 is filled into the spring antenna 421 in advance, the rubber sheet 37 will not excessively sink into the spring antenna.

According to the tire related to the present embodiment, the following effects are exerted in addition to the above-mentioned (1) to (10).

(11) In the present embodiment, the RFID tag 40 serving as the electronic component having a communication function has the spring antenna 421, and a step is included of arranging the rubber 46 in the spring antenna 421, prior to the step of pasting the RFID tag 40 to the bead filler 22 or rubber sheet 37. Upon the step of interposing the spring antenna 421 of the RFID tag 40 between rubber members, since it becomes unnecessary to be concerned over air pockets, the assembly property becomes favorable. (12) The present embodiment provides a step of arranging the rubber 46 within the spring antenna 421 of the RFID tag 40 serving as an electronic component having a communication function; a step of interposing the RFID tag 40 having the spring antenna 421 into which the rubber 46 was arranged, by the coating rubber sheets 431, 432, and an arrangement step of arranging the RFID tag 40 interposed by the coating rubber sheets 431, 432 between the bead filler 22 and rubber sheet 37. The air 45 will thereby not remain inside the spring antenna 421. In addition, since it is unnecessary to be concerned about air pockets, the work of interposing the RFID tag 40 by the coating rubber sheets 431, 432 also becomes sample. In addition, since the distance L between the outer circumferential part of the spring antenna 421 and the outer surface of the rubber sheets 431, 432 is stabilized, the RFID tag 40 is sufficiently protected by the coating rubber sheets 431, 432.

(13) The present embodiment includes: a step of arranging the rubber 46 within the spring antenna 421 of the RFID tag 40 serving as an electronic component having a communication function; and a step of pasting the rubber sheet 37 to the bead filler 22 so as to interpose the uncoated RFID tag 40 between the bead filler 22 and rubber sheet 37. By interposing the uncoated electronic component directly between the bead filler 22 and rubber sheet 37, the fluctuation in thickness of the rubber member at the portion interposing the RFID tag 40 decreases, and thus the uniformity of the tire improves. In addition, since the rubber 46 is filled in advance into the spring antenna 421, the rubber sheet 37 will not excessively sink into the spring antenna.

It should be noted that, although the tire of the present invention can be adopted as various types of tires such as for cars, light trucks, trucks and buses, it is particularly suitable as a tire of a truck, bus, etc. It should be noted that the present invention is not to be limited to the above-mentioned embodiments, and that even when carrying out modifications, improvements, etc. within a scope capable of achieving the object of the present invention, it is encompassed by the scope of the present invention.

What is claimed is:

1. A tire comprising:
    a bead core;
    a bead filler which extends to an outer side, in a tire-radial direction, of the bead core;
    a carcass ply which extends from the bead core to another bead core, the carcass ply having a folding end that is folded back around the bead core;
    a chafer arranged so as to cover the carcass ply around the bead core;
    a sidewall rubber and a rim strip rubber which constitute portions of an outer surface in a tire-width direction of the tire;
    a rubber sheet which covers the folding end of the carcass ply which has been folded back, the rubber sheet having a uniform thickness in the tire-radial direction;
    a first pad which covers and contacts an outer side, in the tire-width direction, of the folding end of the carcass ply, and an outer side, in the tire-width direction, of the rubber sheet, and extends outward in the tire radial direction; and
    a second pad which covers an outer side, in the tire-width direction, of the first pad, and which is provided between the first pad and the rim strip rubber and interiorly of the sidewall rubber in the tire-width direction, and contacts inner sides, in the tire-width direction, of the rim strip rubber and sidewall rubber;
    wherein an outer side, in the tire radial direction, of the first pad, tapers while approaching an outer side in the tire-radial direction; and
    wherein an electronic component is provided between the bead filler and the rubber sheet and in direct contact with the bead filler and the rubber sheet.

2. The tire according to claim 1, wherein the rubber sheet is formed in an annular shape, and the rubber sheet covers the folding end of the carcass ply over an entire circumference thereof.

3. The tire according to claim 2,
    wherein the bead filler is formed in an annular shape,
    wherein the rubber sheet is formed in an annular shape by one end side and another end side of a long sheet being joined, and
    wherein the electronic component is provided between the bead filler and the rubber sheet of annular shape within a range of +90 to +270 degrees, when defining a position at which being joined as 0 degrees, with a center of the bead filler as a reference.

4. The tire according to claim 1, wherein the electronic component in an uncoated state is disposed between the bead filler and the rubber sheet.

5. The tire according to claim 1, wherein the electronic component is covered by a coating rubber sheet, and the electronic component covered by the coating rubber sheet is disposed between the bead filler and the rubber sheet.

6. The tire according to claim 5, wherein a modulus of the coating rubber sheet is lower than a modulus of the rubber sheet.

7. The tire according to claim 1, wherein the rubber sheet includes an interior layer on a side facing the electronic component, and an outer layer which is more to an outer side than the interior layer, wherein a modulus of the interior layer is lower than a modulus of the outer layer.

8. The tire according to claim 1, wherein a modulus of the first pad and a modulus of the second pad are higher than a modulus of the bead filler.

9. The tire according to claim 8, wherein the modulus of the first pad is higher than the modulus of the second pad.

10. The tire according to claim 1, wherein:
   a modulus of the first pad is 1.1 to 1.2 times a modulus of the second pad; and
   a modulus of the rubber sheet is 1.1 to 1.2 times the modulus of the second pad.

11. The tire according to claim 10, wherein a modulus of the side wall rubber is 0.4 to 0.6 times the modulus of the second pad.

12. The tire according to claim 10, wherein:
   the bead filler includes a first bead filler and a second bead filler, which is arranged on an outer side, in the tire-radial direction, of the first bead filler; and
   a modulus of the second bead filler is 0.7 to 0.8 times the modulus of the second pad.

13. The tire according to claim 6, wherein a modulus of the coating rubber sheet is 0.5 to 0.8 times a modulus of the rubber sheet.

14. The tire according to claim 1, wherein the first pad further contacts an outer side, in the tire-radial direction, of an end part of the chafer.

15. The tire according to claim 1, wherein the second pad further contacts an outer side, in the tire-width direction, of the bead filler.

* * * * *